United States Patent
Brown et al.

(10) Patent No.: US 7,427,177 B2
(45) Date of Patent: Sep. 23, 2008

(54) METHOD OF USING PULSED OZONE TO TREAT SOILS CONTAINING ORGANIC CONTAMINANTS

(75) Inventors: Richard A. Brown, Lawrenceville, NJ (US); James Lute, Cranbury, NJ (US); Dave Robinson, Mt. Laurel, NJ (US); George Skladany, Newtown, PA (US); Christopher Nelson, Castle Rock, CO (US)

(73) Assignee: Shaw Intellectual Property Holdings, Inc., Baton Rouge, LA (US)

(*) Notice: Subject to any disclaimer, the term of this patent is extended or adjusted under 35 U.S.C. 154(b) by 0 days.

(21) Appl. No.: 11/217,126

(22) Filed: Aug. 31, 2005
(Under 37 CFR 1.47)

(65) Prior Publication Data
US 2006/0058567 A1    Mar. 16, 2006

Related U.S. Application Data

(63) Continuation of application No. 10/266,467, filed on Oct. 8, 2002, now abandoned, which is a continuation of application No. 09/300,500, filed on Apr. 28, 1999, now abandoned.

(60) Provisional application No. 60/083,327, filed on Apr. 28, 1998.

(51) Int. Cl.
*B09B 3/00* (2006.01)

(52) U.S. Cl. .................. 405/128.1; 405/128.15; 405/128.5; 405/128.7; 405/128.75; 405/258.1; 405/263; 435/262.5; 435/264; 588/320; 588/402; 588/403; 588/405; 588/406

(58) Field of Classification Search ............. 405/128.1, 405/128.15, 128.5, 128.7, 128.75, 258.1, 405/263; 435/262.5, 264; 588/320, 405, 588/406, 402, 403
See application file for complete search history.

(56) References Cited

U.S. PATENT DOCUMENTS

| 4,793,931 | A |   | 12/1988 | Stevens et al. |
|---|---|---|---|---|
| 4,978,508 | A |   | 12/1990 | Hansen et al. |
| 5,259,962 | A |   | 11/1993 | Later |
| 5,384,048 | A |   | 1/1995 | Hazen et al. |
| 5,552,059 | A |   | 9/1996 | Chow |
| 5,566,627 | A | * | 10/1996 | Pryor .................. 111/118 |
| 5,624,635 | A |   | 4/1997 | Pryor |
| 5,753,494 | A |   | 5/1998 | Hater et al. |
| 5,855,775 | A | * | 1/1999 | Kerfoot .................. 210/170 |
| 6,083,407 | A | * | 7/2000 | Kerfoot .................. 210/747 |
| 6,284,143 | B1 | * | 9/2001 | Kerfoot .................. 210/747 |
| 6,306,296 | B1 | * | 10/2001 | Kerfoot .................. 210/170 |
| 6,312,605 | B1 | * | 11/2001 | Kerfoot .................. 210/741 |
| 6,403,034 | B1 | * | 6/2002 | Nelson et al. ............. 422/32 |

FOREIGN PATENT DOCUMENTS

JP            92 06782        8/1997

* cited by examiner

*Primary Examiner*—Steven Bos
(74) *Attorney, Agent, or Firm*—Luedeka, Neely & Graham, P.C.

(57) ABSTRACT

A method of treating a solid matrix containing organic contaminants is provided. The method comprises the steps of a) injecting ozone into the solid matrix for a period of time known as the pulse duration; b) interrupting the injection of ozone into the solid matrix for a period of time known as the gap duration; and c) repeating step a) at least one additional time. Gap durations of from about 2 hours to about 48 hours are disclosed. Pulse durations of from about 0.25 hours to about 8 hours are also disclosed. Recalcitrant organic contaminants are treated.

28 Claims, 10 Drawing Sheets

Figure 4  Pentachlorophenol(PCP) Destruction (percent destroyed)
12 hours Total O₃

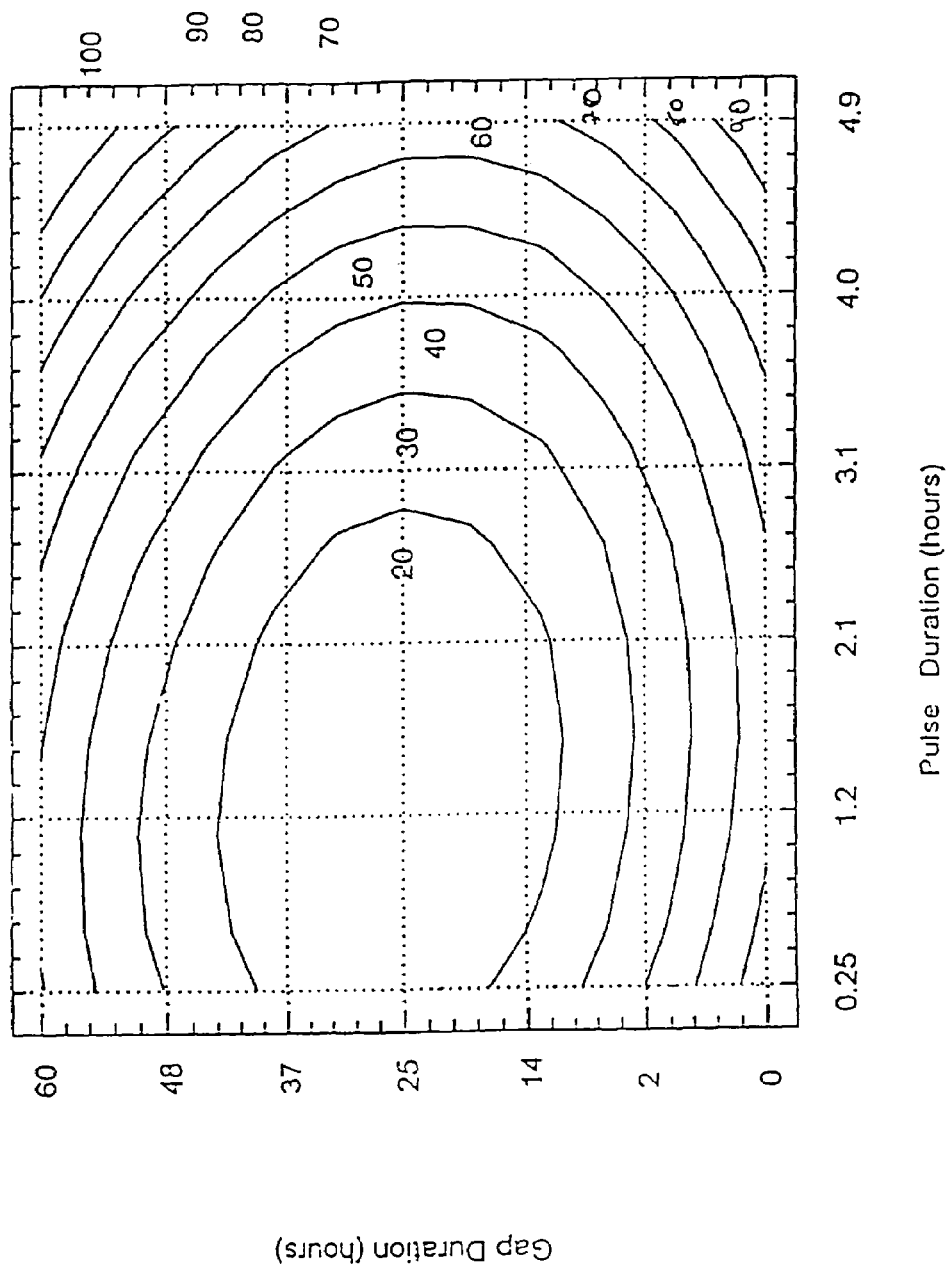
Figure 6  Hexachlorobenzene(HCB) Destruction (percent destroyed)
12 hours Total $O_3$

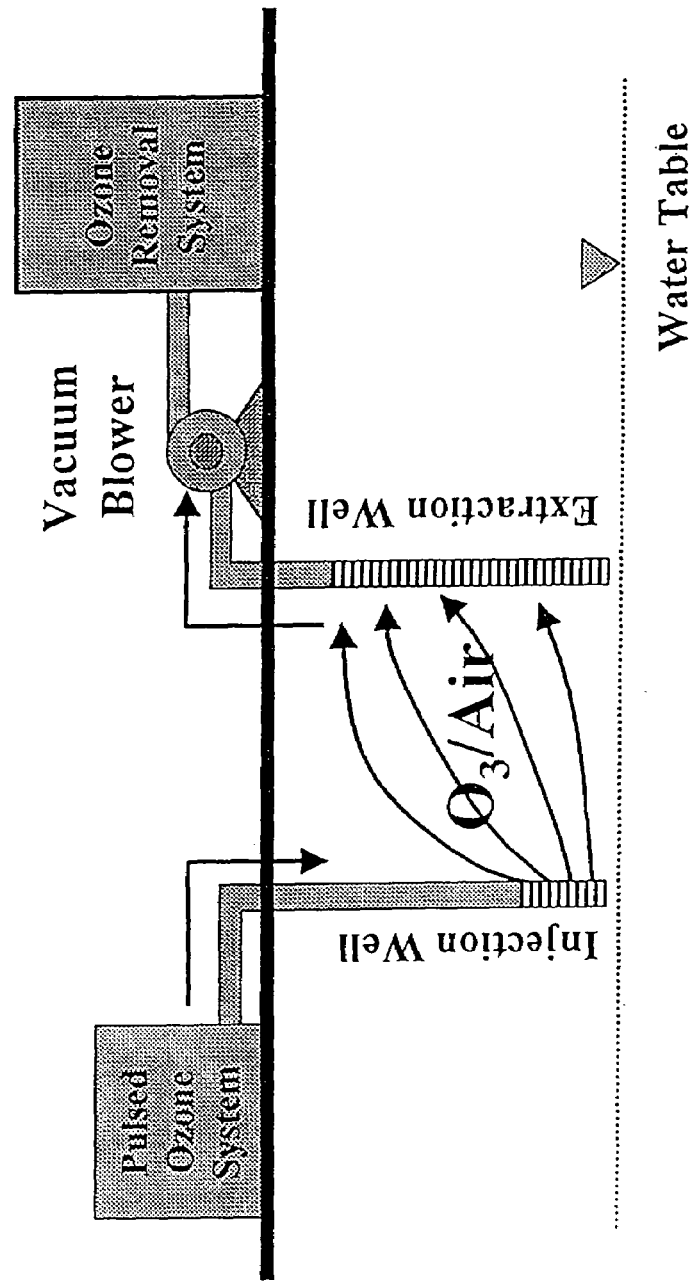
Figure 7: Vadose Zone System

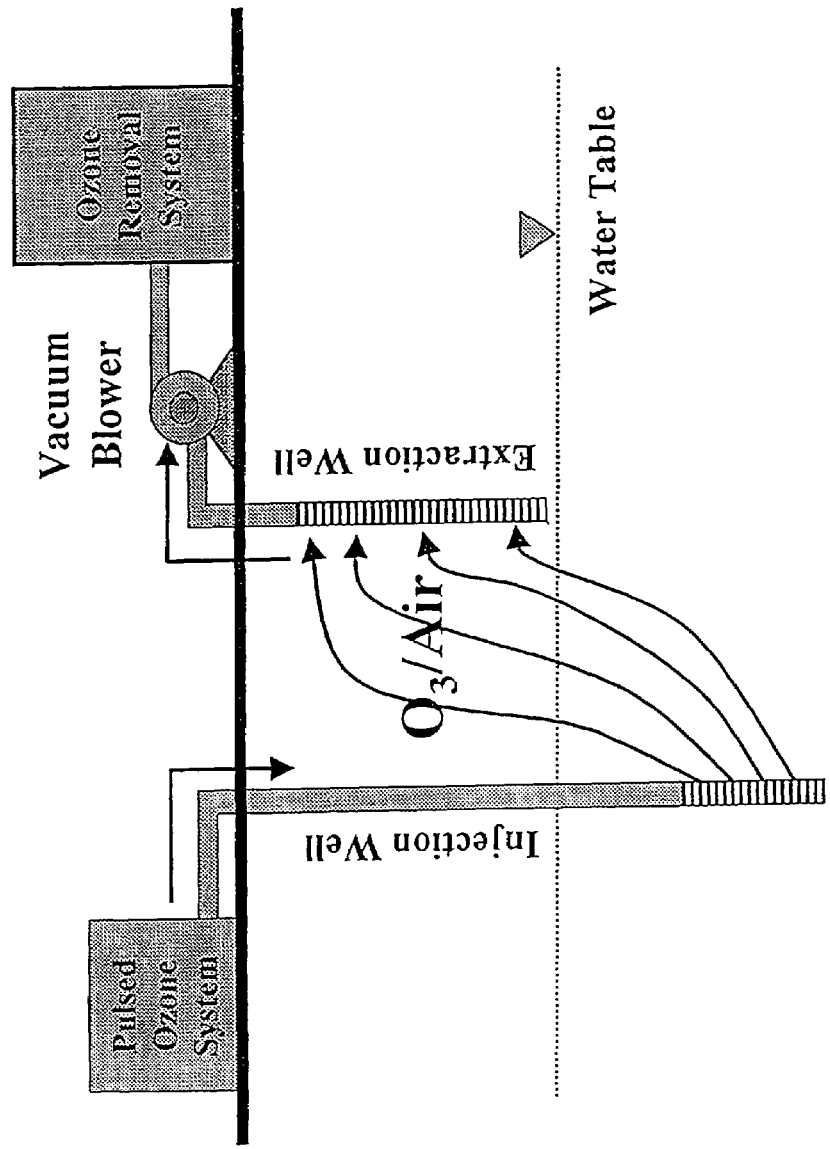
Figure 8: Saturated Zone System

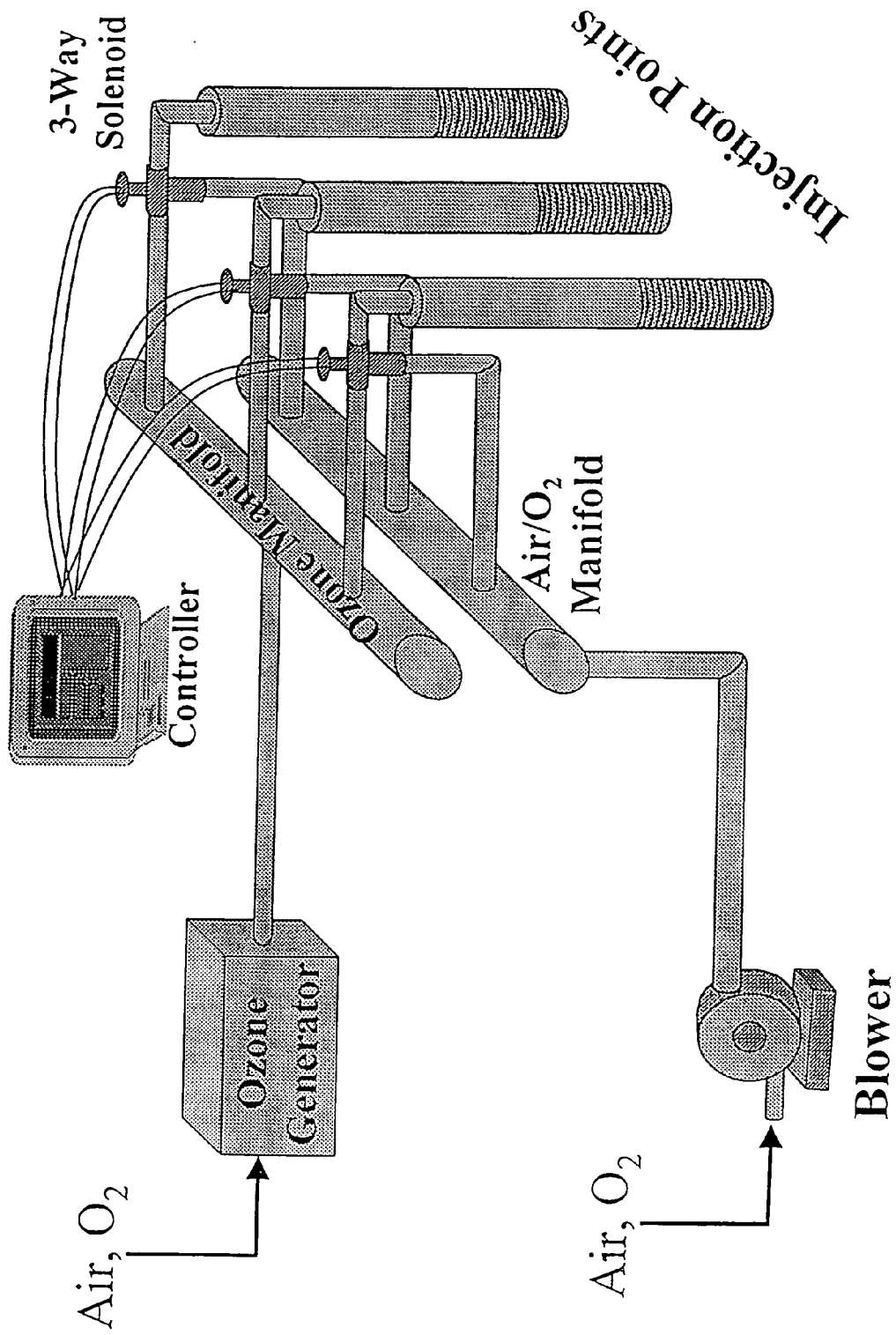
Figure 9: Parallel Ozone Pulsing System

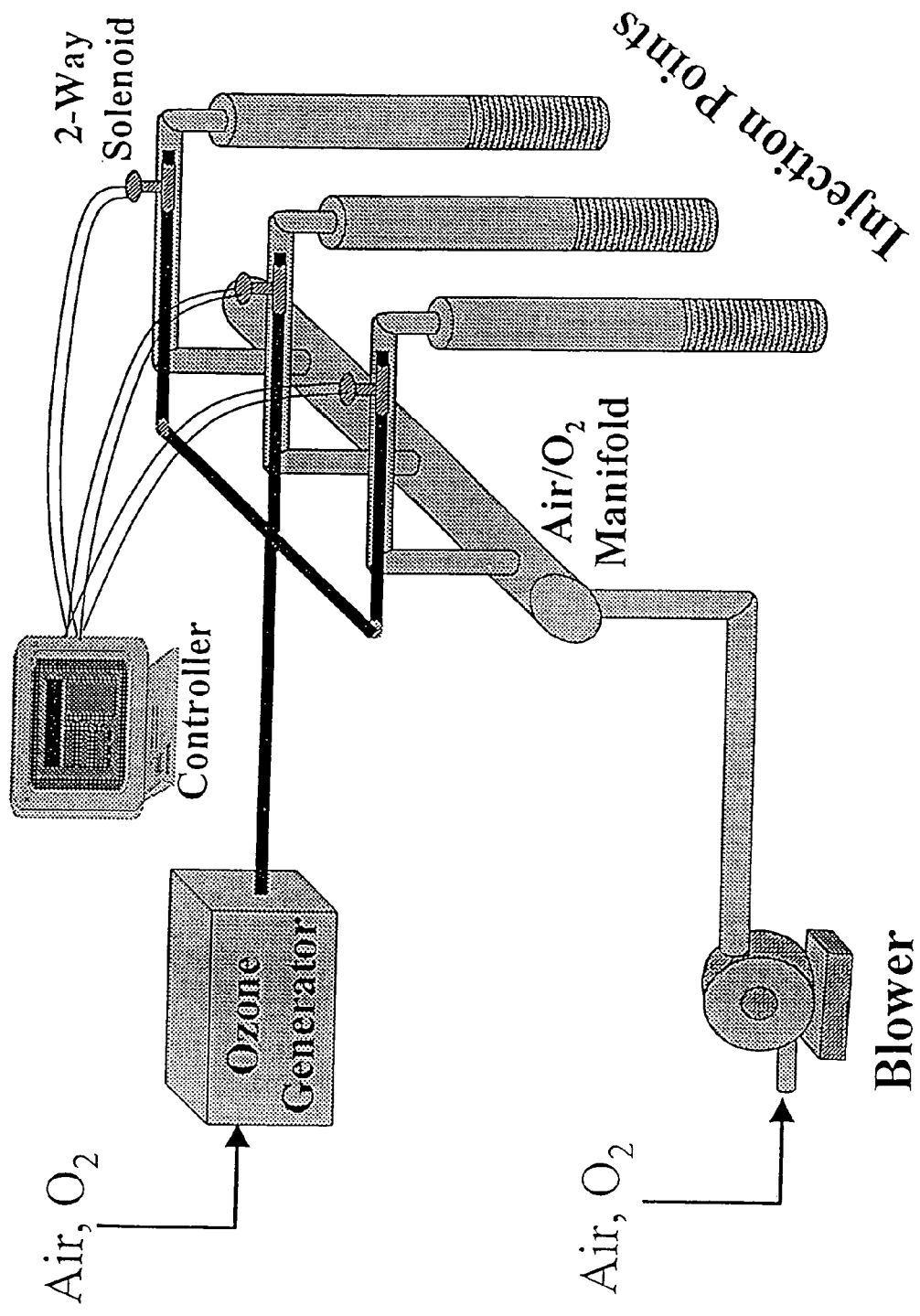
Figure 10: Coaxial Ozone Pulsing System

METHOD OF USING PULSED OZONE TO TREAT SOILS CONTAINING ORGANIC CONTAMINANTS

This application is a continuation of application Ser. No. 10/266,467 filed Oct. 8, 2002, now abandoned which in turn is a continuation of application Ser. No. 09/300,500 filed Apr. 28, 1999, now abandoned which in turn claims the benefit of the earlier filing date of copending provisional application 60/083,327, filed Apr. 28. 1998.

BACKGROUND OF THE INVENTION

Ozone is a gas with strong oxidizing properties. It is commonly generated by forcing oxygen or air through narrowly spaced electrodes under a high voltage, known as the corona discharge method. The first commercial uses of ozone occurred in Europe in the late 1890's for the treatment of drinking water. Since then, ozone has been widely used for both the treatment of drinking water and wastewater.

Ozone can react with organic contaminants via two general pathways: a) direct oxidation; and b) oxidation through the formation of free radical intermediaries. The most common radical pathway utilizes hydroxyl radicals. Contaminants most amenable to direct oxidation include polynuclear aromatic hydrocarbons, chlorinated ethenes such as trichlorethylene, and chlorinated phenols such as pentachlorophenol (PCP). A wider range of organic contaminants, including halogenated solvents, pesticides and aliphatic hydrocarbons, can be oxidized slowly by direct oxidation or more rapidly oxidized by the hydroxyl radical mechanism. Following only fluorine, which has an oxidation potential of 3 volts, hydroxyl radicals (oxidation potential of 2.96 volts) and ozone (oxidation potential 2.07 volts) are the second and third strongest oxidants known.

At many industrial and commercial facilities throughout the United States, soil and groundwater have become contaminated with organic pollutants. Accidental spills have occurred at other sites contaminating both soil and groundwater. A variety of techniques have been developed for the removal of these contaminants. One common technique is soil excavation and off-site treatment of the soil, which is often very expensive. Another treatment involves air sparging technology using the controlled injection of air to strip organic compounds from the water or to supply oxygen for bioremediation of the contaminants. However, chlorinated olefins and complex aromatics are often resistant to sparging and bioremediation, thereby requiring more complex and expensive treatments.

Ozone has been shown to be an effective oxidant in the treatment of organic contaminants in solid matrices such as soils (both saturated and unsaturated) and sludges. Previously, the successful treatment of contaminated solid matrices has involved the continuous application of ozone. Experience with this approach has demonstrated that persistent, continuous ozonation of a contaminated solid matrix can be an effective way of treating a wide range of organic contaminants contained within the solid matrix. Because ozonation is a direct chemical reaction, the rate and effectiveness is expected to be proportional to the mass of ozone added (weight percent, flow and time). The higher the ozone mass, the more effective the reaction with the contaminants is expected to be.

While continuous ozonation of solid matrices containing organic contaminants is effective, it is also very expensive. Ozone generators are costly not only to purchase but also to operate. Ozone generators require a lot of power. As a result of the high cost of using continuous ozonation to treat solid matrices containing organic contaminants, ozonation is not often a reasonable choice when evaluating the options available for cleaning up a particular contaminated site.

It has been known that a single application of ozone could improve the biodegradability of contaminants. This approach involved using a single stage of ozone treatment followed by biological treatment of the contaminants. Since ozone is a microbial sterilant, there has always been the concern that the ozone pretreatment would negatively impact or even completely destroy the biodegradation phase by destroying the microbes upon which biodegradation relies.

It is an object of the present invention to provide a method of treating a solid matrix containing organic contaminants by using ozone. It is a further object of this invention to provide a cost effective method of treating a solid matrix containing organic contaminants by using ozone in an efficient manner. Other objects of the present invention will appear from the disclosure presented herein.

SUMMARY OF THE INVENTION

This invention provides a method for the treatment of a solid matrix containing organic contaminants. The method includes the steps of a) injecting ozone into the solid matrix for a period of time known as the pulse duration; b) interrupting the injection of the ozone into the solid matrix for a period of time known as the gap duration; and repeating step a) at least one additional time.

BRIEF DESCRIPTION OF THE DRAWINGS

FIG. 1 through 6 are graphs showing the effect of three variables (pulse duration, gap duration, and total ozonation time) on the destruction of several classes of organic compounds (TPH/PAH, PCP and HCB) using ozone.

FIGS. 1 and 2 are graphs showing the percent reduction of TPH/PAH as a function of the pulse duration and the gap duration. FIG. 1 is for a short total ozonation time. FIG. 2 is for a long ozonation time.

FIGS. 3 and 4 are graphs showing the percent reduction of PCP as a function of the pulse duration and the gap duration. FIG. 3 is for a short total ozonation time. FIG. 4 is for a long ozonation time.

FIGS. 5 and 6 are graphs showing the percent reduction of HCB as a function of the pulse duration and the gap duration. FIG. 5 is for a short total ozonation time. FIG. 6 is for a long ozonation time.

FIG. 7 is a schematic drawing of a vadose zone system.

FIG. 8 is a schematic drawing of a saturated zone system.

FIG. 9 is a schematic drawing of a parallel ozone pulsing system.

FIG. 10 is a schematic drawing of a co-axial ozone pulsing system.

DETAILED DESCRIPTION OF THE INVENTION AND PREFERRED EMBODIMENT

Figure 1:
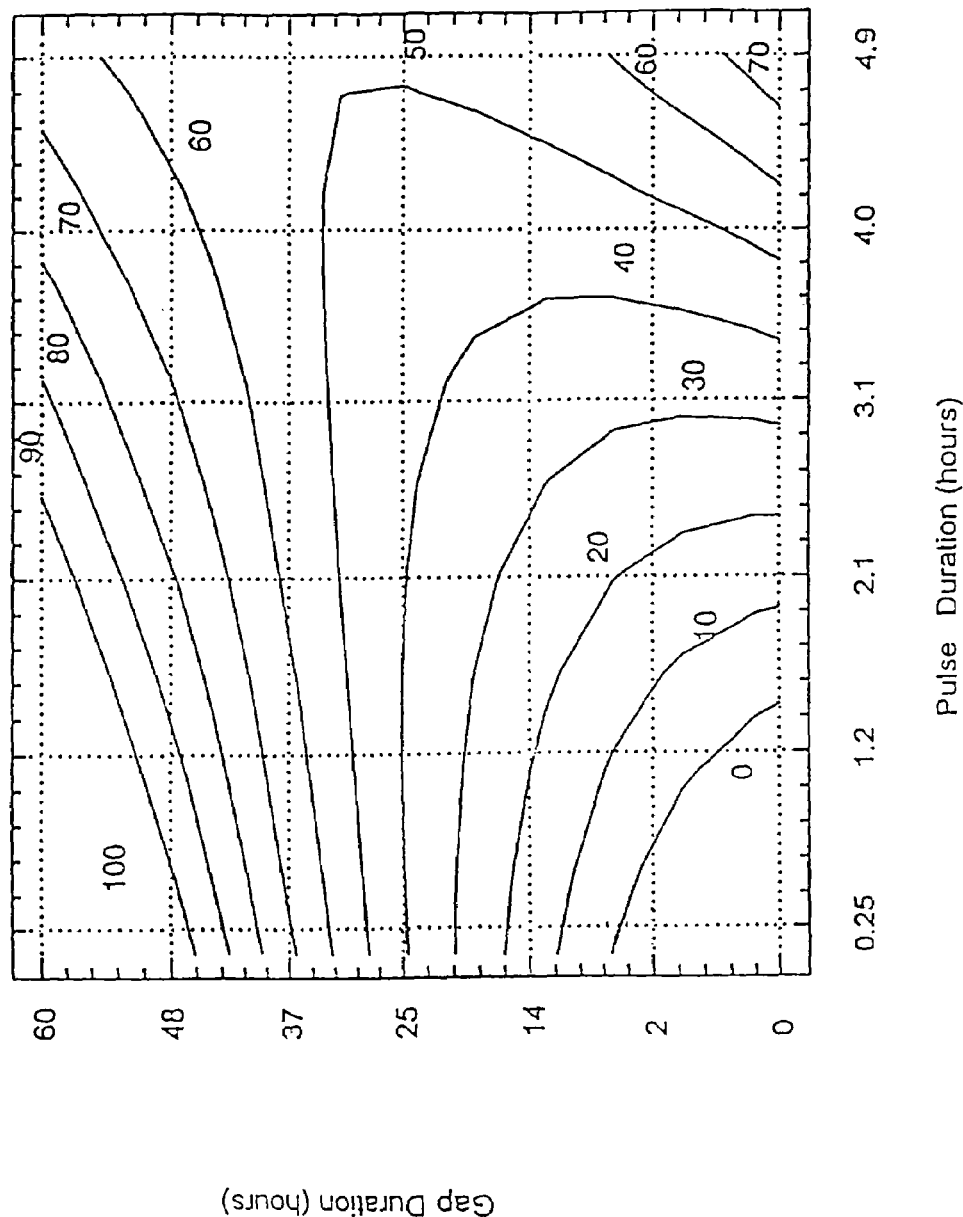

The invention disclosed herein was discovered while searching for a way to reduce the high cost of using ozone as a treatment technology for solid matrices containing organic contaminants. Previous ozonation development had been based on the sustained, continuous application of ozone. Earlier work had shown that many organic contaminants thus could be oxidized with ozone. However, such treatment required high mass loadings of ozone relative to the organic contaminant present to effect the oxidation. The result of this initial development was the view that ozone treatment was an expensive, niche technology, being able to destroy many organic contaminants but at a high cost. As a consequence, the use of continuous ozonation has not been widely practiced.

Since ozone reaction with organic compounds is a chemical oxidation, the rate and the extent of oxidation are a function of the mass and the concentration of ozone added. Ozonation was thought to require a mass loading of greater than stoichiometry (~3 Kg ozone/Kg organic). To supply these levels of ozone, it was generally expected that achieving acceptable reactions would require a sustained, continuous application of ozone to the solid matrix containing the organic contaminant. Such continuous application of ozone would require a multiplicity of ozone generators for sites with multiple injection points thereby raising both the capital and the operating costs for the site being remediated. Because of the high cost associated with continuous ozonation, alternatives were explored.

The first alternative was to consider combining ozonation and bioremediation. By using bioremediation to destroy at least some of the contaminant mass, less ozone overall would be required, thereby lowering the cost of the operation. Bioremediation is a relatively inexpensive process, often requiring simple aeration of the contaminant mass. Bioremediation is, however, a slower process than ozonation and is limited to treating more soluble and reactive organic contaminants. Biodegradation, by itself, is unable to effectively degrade many insoluble recalcitrant organics. The combination of ozonation and bioremediation could minimize the amount of ozone used by using biological treatment to effect much of the contaminant removal. Pre-oxidation with ozone, i.e., oxidation with ozone prior to bioremediation, could also make the organic contaminants present in the solid matrix more amenable to biodegradation. Thus, the combination of these two technologies could provide a cost effective method for destroying organic contaminants contained in the solid matrix.

Because ozone is ultimately toxic to bacteria, adding too much ozone to a system would destroy the bacteria thereby making bioremediation an impossibility without adding or regenerating an adequate microbial population. It was decided that one way to combine ozonation with bioremediation was to intermittently pulse ozone into the solid matrix containing the organic contaminants, i.e., turning the ozone on for a period of time, turning the ozone off for a period of time, turning the ozone back on for a period of time, and so forth. While the ozone was turned on and was injected into the solid matrix for a period of time known as the pulse duration, the ozone would attack the organic contaminants and degrade them to more biodegradable compounds. When the ozone was turned off, thus interrupting the flow of ozone to the contaminated matrix for a period of time known as the gap duration, bioremediation would be the main degradation mechanism for the organic contaminants. Using a short ozone pulse duration would minimize the toxic effect of the ozone on the microbial population, while using a long gap duration would allow the microbial population to regenerate and degrade the partially oxidized contaminants in the solid matrix.

With this thinking a Creosote Lab Study was conducted.

Creosote Lab Study—Phase I

The work scope planned to compare the effectiveness of bioremediation, ozonation and combined ozonation-bioremediation on the treatment of creosote contaminated soils. There were three criteria that would be used to evaluate the success of the treatment: removal of PAHs (polyaromatic hydrocarbons), removal of TPH (total petroleum hydrocarbons), and removal of NAPLs (non-aqueous phase liquids). It was expected that: 1) Ozone would destroy PAHs, but would not be effective on TPH or NAPLs. 2) Bioremediation would reduce TPH but would not be effective on PAHs or NAPLs. 3) The combination of ozonation and bioremediation would treat all contaminants and remove NAPLs. The original protocol used 8 soil columns: 3 columns relying upon bioremediation with oxygen injection; 3 columns having pulsed ozone, with oxygen being supplied between each ozone pulse, i.e., during the gap duration; an ozone only column as a control; and a nitrogen only column as a control. The experimental design attempted to maintain the resident microbial population using a short ozone pulse duration. The results of this experimentation showed that ozonation caused a significant reduction in the microbial population by at least three orders of magnitude. The resulting low microbial population density was insufficient to significantly contribute to contaminant reduction by biologically oxidative mechanisms. This reduction in overall population density appeared to be unrelated to the ozone because the micro-organisms in the oxygen only columns also showed a die-off. It appeared from follow-up work that the die-off was due to the inability of the micro-organisms to tolerate levels of ammonia-nitrogen and orthophosphate-phosphorus that spiked into the soils at the level of contamination. This was an unusual and totally unexpected result. Nutrient toxicity at the spiked concentration levels had not been observed in any previous treatability work.

A second surprising result was observed from this initial work in the Creosote Lab Study. Although the microbial population had been reduced to a level that would be ineffective in contaminant removal, the periodic pulsing of ozone was effective in reducing the target PAHs and TPH. The ozone pulsing applied an amount of ozone equivalent to only 7.7 hours of continuous ozonation (determined by adding together all of the pulse duration times). This resulted in an average PAH reduction of almost 70% and a TPH reduction of 60%. The pulsed oxygen control column showed essentially no change in either TPH or PAHs. By way of comparison, the continuous ozonation column only showed a PAH and TPH reduction of only 42%. The nitrogen control column, which was exposed to 41 hours of continuous nitrogen gas, achieved a 4.5% reduction in PAH levels and no reduction in TPH concentrations. These tests demonstrated that ozone can effectively reduce PAH and TPH levels and that pulsing ozone into the soil has a substantial efficiency benefit in PAH/TPH removal. Based on the results of this study, modifications were made to the experimental plan for Phase II of the Creosote Lab Study.

Creosote Lab Study—Phase II

The goal of Phase II of the Creosote Lab Study was the destruction of the total target contaminants (PAH and TPH) to below clean-up levels. The soil columns from Phase I of the study were modified in Phase II as follows:

Continuation of Pulsed Ozonation: During Phase I of the Creosote Lab Study, this column had originally received 1 hour of ozonation (pulse duration) every four days (gap duration) of operation. During the gap duration time period, i.e., when the ozone was turned off, this column had received room air on a continuous basis. During Phase II, this column continued to receive pulsed ozonation until the study was completed. This column examined the effects of pulsed ozonation alone on the target contaminants for an extended testing period.

Pulsed Ozonation with Reinoculation, Original TPH/PAH Levels: During Phase I, this column had received one hour (pulse duration) of oxygen gas every four days of operation (gap duration). During the gap duration period, i.e., when the oxygen was turned off, the column received room air on a continuous basis. At the end of Phase I, there was no degradation of TPH or PAHs. During Phase II, this column was re-inoculated with a commercial hydrocarbon-degrading culture and received pulsed ozone for the remainder of the study.

Pulsed Ozonation with Reinoculation, Reduced TPH/PAH Levels: During Phase I, this column received one hour (pulse duration) of ozone every four days of operation (gap duration). During the gap duration period, i.e., when the ozone was turned off, the column received room air on a continuous basis. During Phase II, this column was reinoculated with a commercial hydrocarbon-degrading culture and received pulsed ozone for the remainder of the study.

Pulsed Oxygen Control: During Phase I, this column received one hour (pulse duration) of oxygen every four days of operation (gap duration). During the gap duration period, i.e., when the oxygen was turned off, the column received room air on a continuous basis. During Phase II, this column was reinoculated with a commercial hydrocarbon-degrading culture and received pulsed oxygen for the remainder of the study.

Continuous Ozonation: During Phase I, this column had received only air on a continuous basis. During Phase II of this study, this column was exposed to continuous ozonation (Monday through Friday) over a two-week period.

As shown in the following table, the target PAH levels (PAH <473 ppm) were finally achieved after 38 hours of total ozonation in a pulsed mode (the 38 hours is the cumulative total of all of the ozone pulse duration times):

| Description | Results, PPM |
| --- | --- |
| Original Soil | Total PAHs 1745; TPH 6600 |
| Pulsed Ozone - no reinoculation 38 Hours Total Ozonation Time | Total PAHs 110; TPH 390 |
| Pulsed Ozone - Reinoculation 28 Hours Total Ozonation Time | Total PAHs 182; TPH 490 |
| Pulsed Ozone - reinoculation 25 Hours Total Ozonation Time | Total PAHs 240; TPH 700 |
| Pulsed oxygen - Reinoculation 19 hours Total oxygen Time | Total PAHs 2008; TPH 6200 |

The purpose of this Creosote Lab Study was to examine the relative performance of ozonation, biodegradation, and combined ozonation and biodegradation in being able to treat LNAPL (light non-aqueous phase liquids) and creosote contaminated soils. The assumption going into the study was that biodegradation was a low cost technology that would address TPH well and PAHs to a moderate extent. Biodegradation was felt to be a potentially efficient means of removing fuel components in the soil but could take a long time to deal with LNAPLs or attain the target levels for PAHs. Ozonation, a potentially more expensive technology, was expected to address the PAHs well and TPH to a moderate extent. Ozone was not expected to be an effective technology to treat LNAPLs. However, giving the strengths of each technology, it was hoped that the combination of ozonation and biodegradation would provide a cost effective approach that would address both the PAHs and TPH (LNAPL).

Continuous ozonation was found to be effective in attaining the target PAH levels. A primary result of the study was the observation that ozone would address the fuel components (LNAPL residual). In the continuous ozonation and the pulsed ozonation studies, TPH was degraded by ~95-99%. A second key observation was that pulsing ozone, in and of itself, provided a significant improvement in the use of ozone without any biological component. The process of using short pulses of ozone to allow biodegradation to occur as well was found to not be necessary. Simply pulsing ozone alone yielded the results that were anticipated for the combined ozonation and biodegradation. Biodegradation, when present, was found to give only an incremental improvement (~10%) over the effect of pulsing alone.

Statistically Designed Study

As a follow-up to the Creosote Lab study, a series of column studies were conducted. The columns contained 500 grams of sterilized, washed and sieved sand. A mixture of creosote, pentachlorophenol (PCP) and hexachlorobenzene (HCB) were added to the columns. Original concentrations were approximately 17,000 ppm creosote, 800 ppm pentachlorophenol and 800 ppm hexachlorobenzene. Three factors were varied:

Pulse Duration—0.25, 1, 2, 3, and 4 hours
Gap Duration—2, 12, 24, 36, and 48 hours
Total Ozonation Time—4, 6, 8, 9, and 12 hours The pulse duration is the time during which the ozone was turned on for a single pulse of ozone. The gap duration is the time during which the ozone was turned off between two separate pulses of ozone. The total ozonation time is the cumulative total of all of the pulse duration times.

Performance was evaluated based on two factors: ozone efficiency—weight of ozone per weight of contaminant oxidized; and percent destruction. The following table shows the results for ozone efficiency based on the three variables studied.

| Ozone Efficiency (wt Ozone/wt Contaminant) | | | | | |
| --- | --- | --- | --- | --- | --- |
| Gap Duration, Hrs | Average Eff. | Pulse Duration, Hrs | Average Eff. | Total Ozonation Time | Average Eff. |
| 2 | 1.56 | 0.25 | 1.30 | 4 | 1.01 |
| 12 | 2.41 | 1 | 2.01 | 6 | 1.40 |
| 24 | 1.49 | 2 | 1.45 | 8 | 1.50 |
| 36 | 1.39 | 3 | 1.56 | 9 | 1.78 |
| 48 | 1.26 | 4 | 1.78 | 12 | 1.90 |
| 30 Hours Continuous | 4.10 | 30 Hours Continuous | 4.10 | 30 Hours Continuous | 4.10 |
| 68 Hours Continuous | 8.4 | 68 Hours Continuous | 8.4 | 68 Hours Continuous | 8.4 |
| 129 Hours Continuous | 18.0 | 129 Hours Continuous | 18.0 | 129 Hours Continuous | 18.0 |

As can be seen from this table there is a big difference in the ozone efficiency between continuous ozonation and pulsed ozonation. Pulsed ozonation is more efficient. For pulsed ozonation, the gap duration time has the greatest effect on ozone efficiency. The shortest gap (2 Hours) shows a moderate efficiency. As the gap increases to 12 hours, the efficiency drops. For the gap duration time, there is a significant improvement in ozone efficiency between 12 and 24 hours. After a gap of 24 hours, there is a slight but continued improvement in efficiency for longer gaps. The pulse duration time shows two results: a good efficiency at an extremely short pulse duration (0.25 Hours) and a second optimal efficiency at 2-3 hours. After a pulse of 3 hours, generally the efficiency decreases with increasing time. This is to be expected as the initial ozonation will react with the more available, mobile contaminants. Once these are reacted it takes proportionately more ozone to oxidize the remaining material. This is especially true of the continuous ozonation. The total ozonation time also affects the efficiency. A big difference between pulsed and continuous ozonation is that the efficiency is greater for the pulsed ozone and does not decrease (greater wt ozone per weight of contaminant) as rapidly with increasing total ozonation time as does that for continuous ozonation. The greater efficiency of pulsing compared to continuous ozonation may be a result of contaminants diffusing out of the solid matrix during the gap time to the surfaces of the matrix where they are then reacted.

The percent reduction achieved for the different types of contaminants was also examined as a function of the three variables—gap duration, pulse duration, and total ozonation time. The following table shows the results for TPH/PAH.

| Percent Reduction TPH/PAH | | | | | |
|---|---|---|---|---|---|
| Gap Duration, Hrs | Average % Reduced | Pulse Duration, Hrs | Average % Reduced | Total Ozonation Time | Average % Reduced |
| 2 | 70.6 | 0.25 | 88.9 | 4 | 50.7 |
| 12 | 59.8 | 1 | 67.5 | 6 | 53.8 |
| 24 | 72.9 | 2 | 75.2 | 8 | 75.8 |
| 36 | 82.9 | 3 | 71.5 | 9 | 81.6 |
| 48 | 84.4 | 4 | 71 | 12 | 81.7 |
| 30 Hours Continuous | 93.4 | 30 Hours Continuous | 93.4 | 30 Hours Continuous | 93.4 |
| 68 Hours Continuous | 97.4 | 68 Hours Continuous | 97.4 | 68 Hours Continuous | 97.4 |
| 129 Hours Continuous | 98.4 | 129 Hours Continuous | 98.4 | 129 Hours Continuous | 98.4 |

The percent reduction in TPH/PAH is most strongly affected by the total ozonation time. It increases with increasing time up to 9 hours. This is to be expected as longer times allow more reaction. The gap duration time has the second largest effect. The percent reduction shows that a very short gap duration (2 hours) achieves a moderate percent reduction. This decreases as the gap duration increases to 12 hours. Between 12 and 24 hours for gap duration there is a significant increase in the percent reduction. The optimum gap duration time for the percent reduction is at a gap of 24 to 36 hours, based on the improvement in performance. Finally the pulse duration has some impact with the optimum either at a very short pulse (0.25 hours) or at about 2-3 hours.

The following table shows the results for PCP.

| Percent Reduction PCP | | | | | |
|---|---|---|---|---|---|
| Gap Duration, Hrs | Average % Reduced | Pulse Duration, Hrs | Average % Reduced | Total Ozonation Time | Average % Reduced |
| 2 | 62.3 | 0.25 | 88 | 4 | 50.7 |
| 12 | 57.4 | 1 | 67.8 | 6 | 49.5 |
| 24 | 78.4 | 2 | 76 | 8 | 80.2 |
| 36 | 84.7 | 3 | 63.8 | 9 | 82 |
| 48 | 90.5 | 4 | 81 | 12 | 88.5 |
| 30 Hours Continuous | 86.3 | 30 Hours Continuous | 86.3 | 30 Hours Continuous | 86.3 |
| 68 Hours Continuous | 93.5 | 68 Hours Continuous | 93.5 | 68 Hours Continuous | 93.5 |
| 129 Hours Continuous | 95.3 | 129 Hours Continuous | 95.3 | 129 Hours Continuous | 95.3 |

PCP is a more recalcitrant (more difficult to react) organic than TPH/PAHs. The reduction of PCP follows the same patterns as that for TPH/PAH, with some exceptions. First, as would be expected the total ozonation time has the greatest effect on the percent reduction. The amount of PCP reacted increases with increasing total ozonation time. The gap duration is also important. In this case PCP reduction increases with increasing gap duration times. The biggest improvement is for gap durations between 12 and 24 hours. The pulse duration has an unusual behavior. Best results are seen at short and long pulse durations. The short pulse duration is surprising.

It takes at least 68 hours of continuous ozonation to equal the performance of the pulsed ozonation. To achieve approximately 90% reduction in PCP pulsed ozonation required approximately 1/7th the amount of ozone as compared to that required for continuous ozonation.

The following table shows the results for HCB.

| Percent Reduction HCB | | | | | |
|---|---|---|---|---|---|
| Gap Duration, Hrs | Average % Reduced | Pulse Duration, Hrs | Average % Reduced | Total Ozonation Time | Average % Reduced |
| 2 | 0 | 0.25 | 27 | 4 | 12.8 |
| 12 | 12.7 | 1 | 17.3 | 6 | 16.3 |
| 24 | 9.2 | 2 | 5.2 | 8 | 8.5 |
| 36 | 22.4 | 3 | 21.7 | 9 | 18.1 |
| 48 | 20.0 | 4 | 10.5 | 12 | 2.6 |
| 30 Hours Continuous | 24.1 | 30 Hours Continuous | 24.1 | 30 Hours Continuous | 24.1 |
| 68 Hours Continuous | 30 | 68 Hours Continuous | 30 | 68 Hours Continuous | 30 |
| 129 Hours Continuous | 42.5 | 129 Hours Continuous | 42.5 | 129 Hours Continuous | 42.5 |

Hexachlorobenzene is an extremely recalcitrant compound. Its behavior under pulsing conditions is very unusual. The total amount of ozonation does not appear to show any definitive relationship. One would expect that increasing the amount of ozonation would increase the percent reduction, as is seen with the continuous study. The factor that has the greatest and most identified affect is the gap duration. The longer the gap duration, the greater the reduction. The pulse duration shows a second order behavior. The best performance is at either short pulses (about 0.25 hours) or long pulses (about 3 hours).

The following table shows the conditions which gave the highest and lowest percent reduction for the different contaminants. As can be seen, the gap duration is extremely important. The best results are with a 24-48 hour gap duration and the worst results are with the short gap durations of approximately 12 hours. The pulse duration for best performance is 0.25 to 3 hours.

| Conditions for Maximum Removal (Top 3) | | | | | |
|---|---|---|---|---|---|
| Contaminant | Gap-Pulse-Time % | | Gap-Pulse-Time % | | Gap-Pulse-Time % |
| TPH/PAH (creosote) | 24-0.25-8 | 88.9 | 36-3-9 | 84.7 | 48-2-8  84.4 |
| Penta-chlorophenol | 48-2-8 | 90.5 | 24-2-12 | 88.5 | 24-0.25-8  88.0 |
| Hexa-chlorobenzene | 36-1-6 | 37.8 | 36-3-9 | 36.6 | 24-0.25-8  27. |

| Conditions for Minimal Removal (% Reduction) | | | |
|---|---|---|---|
| Gap-Pulse-Time, Hours | TPH/PAH (creosote) | Pentachlorophenol | Hexachlorobenzene |
| 12-1-6 | 24.2 | 15.3 | 0.0 |

FIGS. 1-6 depict the effect of the three variables, pulse duration, gap duration and total ozonation time on the destruction of TPH/PAH, PCP, and HCB. The HCB was used as a surrogate for non reactive and highly chlorinated compounds such as PCBs. The results for each compound are shown in two figures; one at low total ozonation time and the second at long total ozonation time. As shown in the figures, the behavior of the three types of compounds under pulsed ozonation is different, reflecting the differences in reactivity. However, there are also some important generalizations that can be made.

Figure 2:
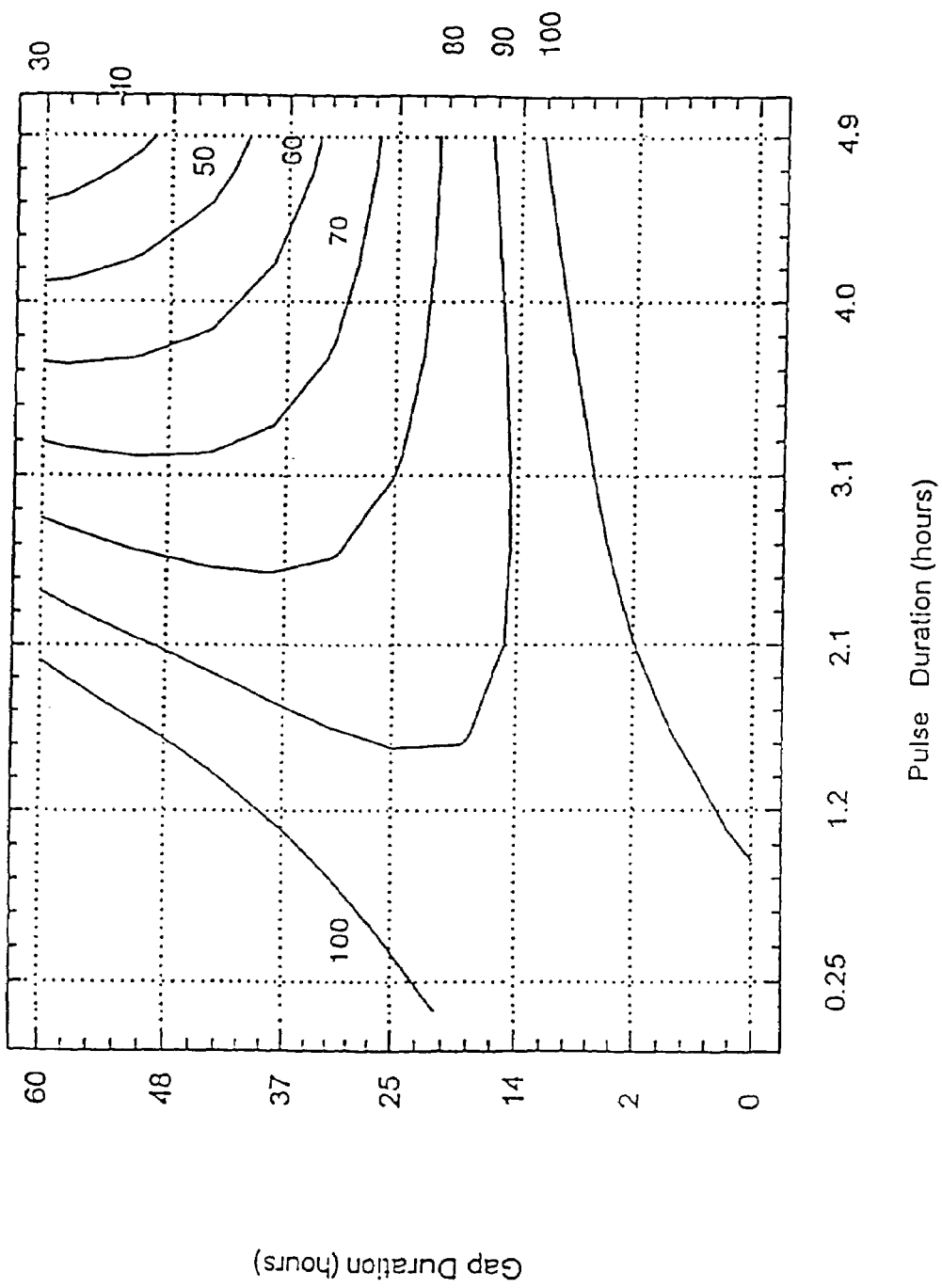

FIGS. 1 and 2 depict the contours for TPH/PAH. FIG. 1 depicts the percent reduction of TPH/PAH as a function of the gap duration and the pulse duration at a low level of ozonation. As shown, the best performance occurs using a moderate to long gap duration with a short to medium pulse duration. At a short gap duration, performance is enhanced by increasing the length of the pulse duration. When the total ozonation time is increased (FIG. 2) the behavior is similar. The best performance is again at long gap durations and short pulse durations, or at short gap durations and long pulse durations. These figures illustrate that the reaction with TPH/PAH can be optimized.

Figure 3:
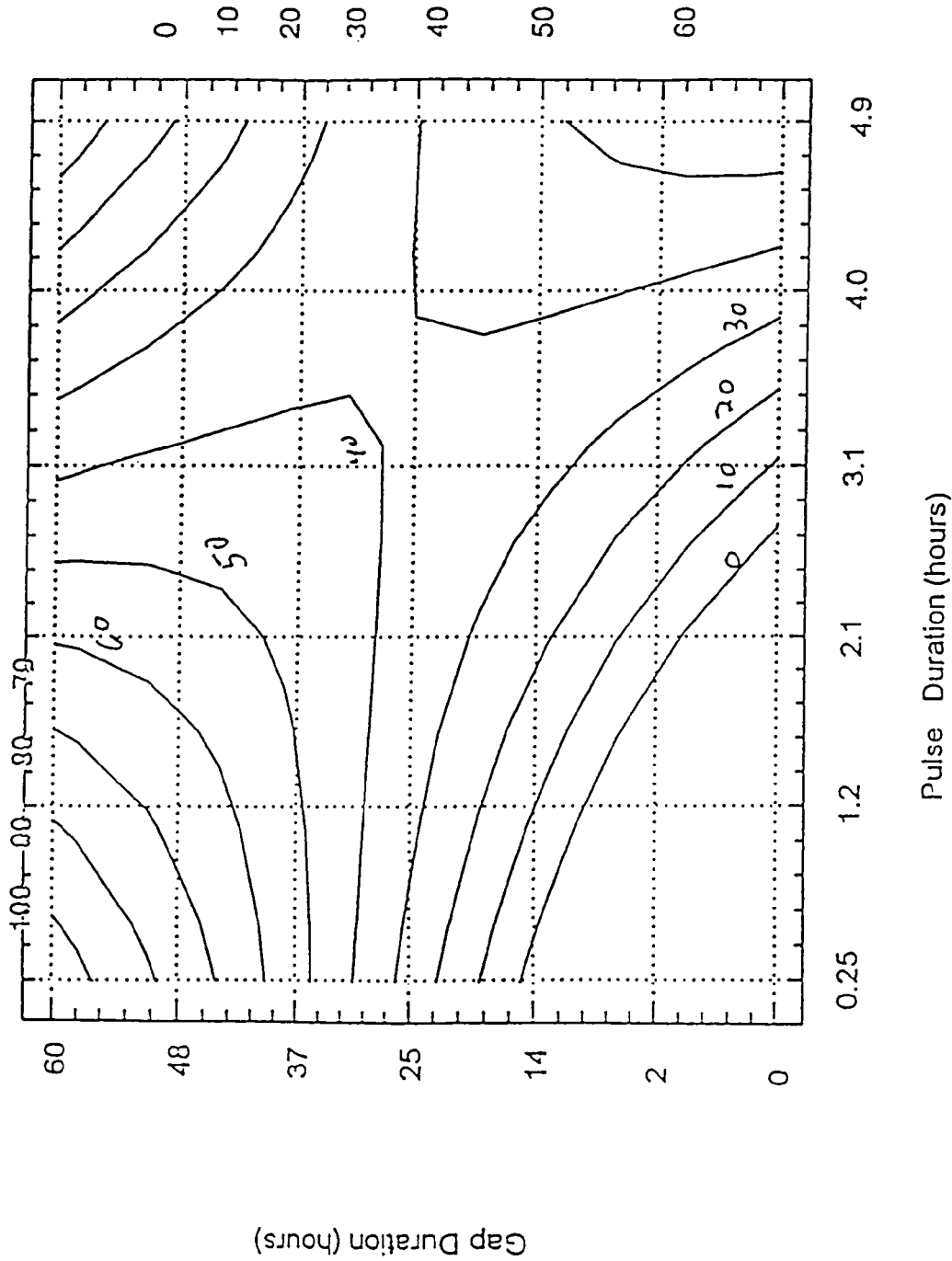
Figure 4:
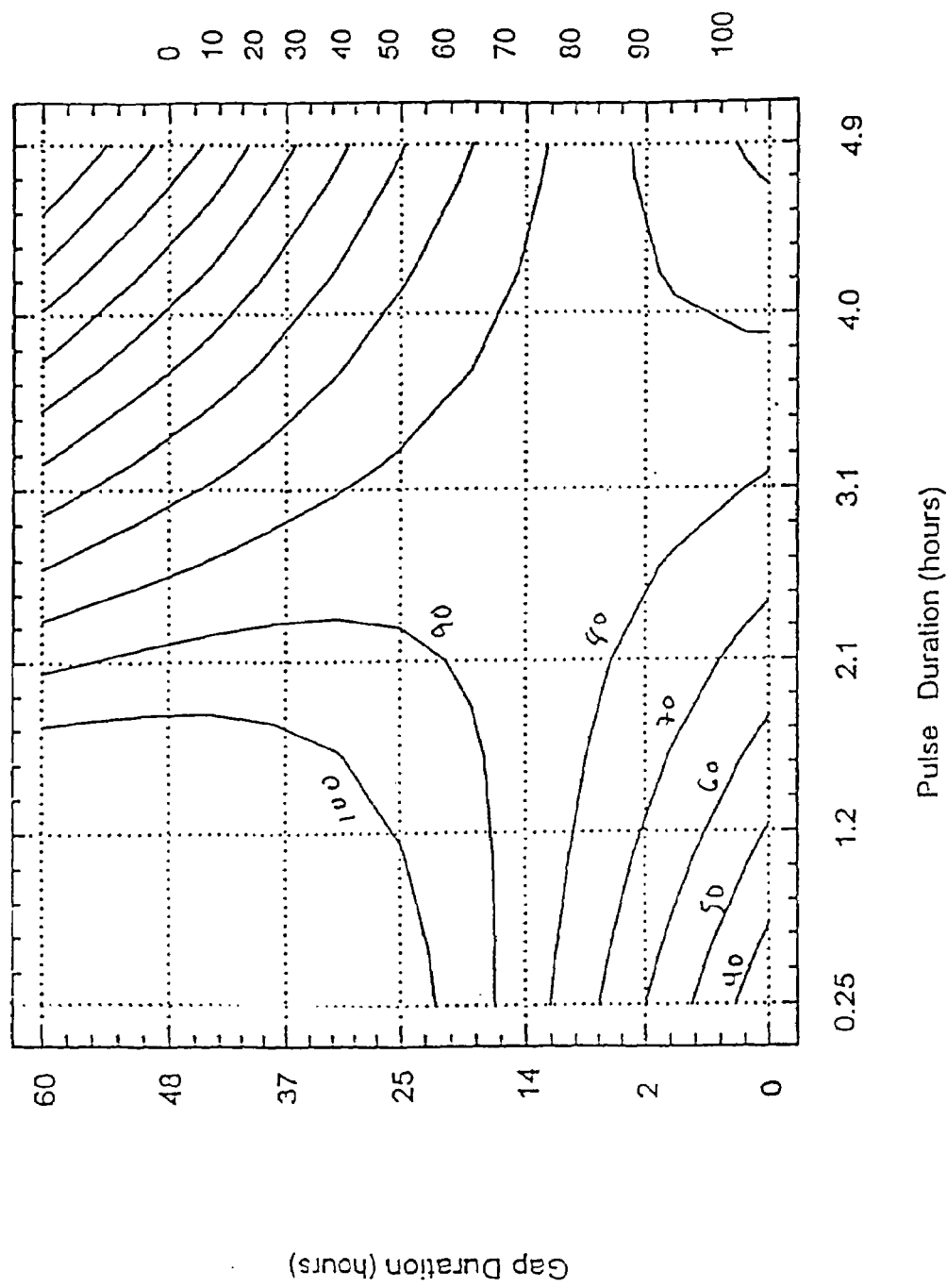

FIGS. 3 and 4 depict the contours for PCP. FIG. 3 depicts the percent reduction of PCP as a function of the gap duration and the pulse duration at a low level of ozonation. The best performance is with a short pulse and a long gap. Moderate performance can be seen at short gaps and long pulses. As seen in FIG. 4, increasing the total amount of ozonation does not significantly alter the response other than generally increasing the percent reduction. Optimal response is still at long gaps-short pulses, or short gaps-long pulses.

Figure 5:
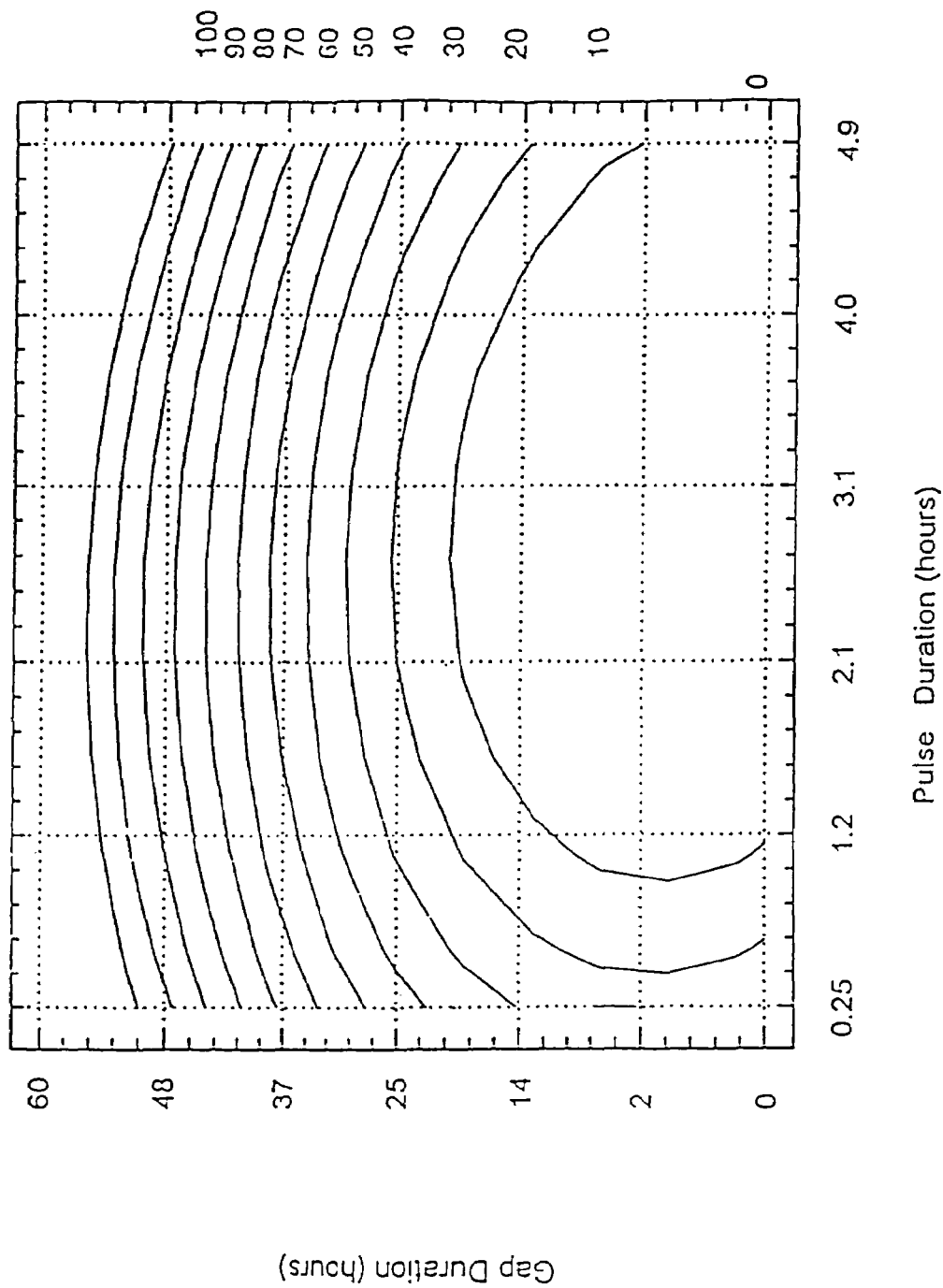

FIGS. 5 and 6 depict the contours for HCB. FIG. 5 depicts the percent reduction of HCB as a function of the gap duration and the pulse duration at a low level of ozonation. The reaction of HCB is very different compared to the other contaminants studied. The best performance is attained with long gaps, almost irrespective of the duration of the pulse. As the total amount of ozone is increased, the best performance shifts to long pulses and long gaps.

Several general conclusions can be drawn from this study.

First, the gap duration used in pulsed ozonation is important. Generally at least a 24 hour gap is most preferred. As the reactivity of the contaminant decreases, the importance of the gap duration increases. Generally the less reactive a contaminant the longer the gap duration.

Second, the pulse duration is important with reactive or moderately reactive contaminants. Short pulses are best, when coupled with long gaps. As the reactivity drops, the importance of the pulse duration drops. If long pulses are used, short gaps are best.

Third, the conditions for best performance are a function of the reactivity of the contaminant. Generally the less reactive the contaminant the longer the gap duration.

Field Study with Coal Tars

A field pilot study of pulsed ozonation was conducted at a former manufactured gas site. The site was contaminated with a mixture of TPH and PAHs. Ozone (5% in oxygen) was injected, in situ, in pulses into a confined aquifer. In between pulses nothing was added. The main concern was the presence of DNAPL (dense non aqueous phase liquids) in the test area. Ozone was sparged into the aquifer at a varying rate. At the beginning of the study, the ozone was pulsed for 1 hour a day for five days. At the end of the study the ozone was pulsed for 8 hours a day for 4 days a week. At the end of twelve weeks DNAPL levels were reduced from as great as about 2 feet to less than 1 inch.

During the study it was thought that biological activity was a key component of the performance. An examination of the data would suggest that at the short pulse durations (1-2 hours/day), biodegradation occurred. Oxygen uptake, a sign of aerobic biodegradation, was observed. For the long pulse durations, there doesn't appear to be much biological activity as the oxygen uptake ceased.

This study illustrates the benefits of pulsing ozone. It also shows that biodegradation is beneficial but is not necessary for contaminant removal. The study was not run to optimize conditions. The gap duration chosen, based on assumed conditions to maintain biological reactivity, varied from about 24 hours during the week to about 48-72 hours over the weekend. These values are, from the other studies, in the proper range.

Coal Tar Lab Study

Two soil and two groundwater samples from a former manufactured gas plant were used in the study. One soil contained high contaminant levels (5,860 mg/Kg total PAHs; 369 mg/Kg carcinogenic PAHs; 18,000 mg/Kg TPH; and 1,151 mg/Kg total BTEX), and represented chemical hot spots at the site. The second soil type ("bulk") was representative of more typical site conditions, and as calculated contained significantly lower target contaminant concentration levels (667 mg/Kg total PAHs; no carcinogenic PAHs; 2,295 mg/Kg TPH; and no total BTEX). The highly contaminated ("hot") soils alone were used in the continuous ozone test, while an approximate 3:1 "mixture" of bulk and hot soil was used in the remaining experiments.

The treatability tests performed indicate that indigenous microorganisms could degrade at least portions of the BTEX, PAH, and TPH contaminants under aerobic conditions and without the addition of supplemental inorganic nutrients. Air stripping was also a potential removal mechanism for the BTEX fraction and certain PAH/TPH compounds. Ozone is an effective chemical oxidant in the treatment of PAH and TPH, and was also expected to successfully treat the BTEX fraction. Ozone could effectively reduce target contaminant concentration levels by greater than 99%. Ozone could be effectively used as a stand alone technology, or in combination with air stripping and biological treatment. The use of combined technologies may provide the most cost-effective option for successfully remediating the target contaminants.

The slurry ozone breakthrough test, using a 20 solids slurry of "sleeved" soil and groundwater, received a total of 78 hours of continuous ozonation, and was used to determine the effects of ozonation on the target contaminants as a function of treatment time. The ozone slurry breakthrough test determines the consumption of ozone by easily oxidized materials, especially non-contaminant ozone consumers. Breakthrough is defined as the point at which the influent and effluent concentrations are approximately equal or the point at which the difference between the influent and effluent concentrations is essentially constant. A similar control flask, receiving a continuous flow of nitrogen gas for 73 hours, was used to correct for any volatile and/or adsorptive contaminant losses. While reductions of greater than 99% were observed for Total PAHs, Total Carcinogenic PAHs, and Total Benzo[a]pyrene Equivalent PAHs in the slurry soil fractions during the 78 hours of treatment, significant contaminant reductions were obtained in as little as 22.6 hours: 96% for Total PAHs, 99% for Total Carcinogenic PAHs, and 99% for Total Benzo[a]pyrene Equivalent PAHs. TPH levels were reduced by 85% after 22.6 hours, 95% after 43.3 hours, and 99% after 55.8 hours. BTEX levels were reduced by greater than 99% during the 22.6 hour period, presumptively due to both chemical oxidation and air stripping. In contrast, the nitrogen control flask showed Total PAH levels reduced by 15%, Total Carcinogenic PAH levels reduced by 19%, and Total Benzo[a]pyrene Equivalent PAH levels reduced by 12% over the 72 hour period, verifying that ozonation was the primary removal mechanism for the PAHs present. TPH levels were reduced by 36%, and Total BTEX concentrations decreased by 99%. BTEX compounds are susceptible to air stripping, as are a limited number of the TPH and PAH compounds present.

Four other conditions, all using 20% slurries, were run. The control study was an aerated sample only to look at volatile removal and biodegradation. The pulsed ozone received 15 minutes of ozone every Monday, Wednesday and Friday for a total of 7.3 hours of ozonation. The gap was 48 hours for the first two pulses and 72 hours for the third pulse. The Bio/Ozone study received just air for ~9 weeks followed by 24 hours of continuous ozone. The Ozone/Bio study received 24 hours of ozone, was reinoculated and then received 9 weeks of aeration. All three of these studies showed elevated bacterial levels. The results of this study are presented below.

Degradation Results, % Removed @ Nine Weeks

|  | Total PAHs | Carcn PAH | TPH | BTEX |
|---|---|---|---|---|
| Air Only | 49 | 0 | 47 | 100 |
| Continuous Ozone (78 hrs) | 99 | 99 | 100 | 100 |
| Pulsed Ozone (0.25 hrs pulses on Mon, Weds, Fri) (7.3 hrs total $O_3$ time) | 89 | 33 | 100 | 100 |
| Ozone/Bio (Sequential 24 hrs Ozone with 9 weeks Bio) | 77 | 56 | 100 | 100 |
| Bio/Ozone (Sequential 9 weeks Bio with 24 hrs Ozone) | 98 | 81 | 100 | 100 |

Four classes of compounds were tracked—Total PAHs, Carcinogenic PAHs, TPH, and BTEX. As can be seen from the results, the pulsed ozone did achieve significant removal of contaminants at a much shorter ozonation time than the other studies. This illustrates that short pulses and long gaps are beneficial to achieving contaminant reduction.

A second observation of this study is that biological activity can be maintained when short pulses and long gaps are used.

A third observation is that the sequential use of biodegradation followed by ozonation does increase performance. This is evidenced by the results of the Bio/Ozone study.

Pulsed ozonation greatly improves the efficiency of ozonation. Because less ozone is used on a unit time basis both the capital and operating cost can be reduced. This is illustrated for a test case as shown below. The site is a 100'×200' area with 6-8 feet of soil needing treatment. The contaminant is creosote.

Continuous Ozonation Assumptions
10 wells injecting 10 SCFM of 3% $O_3$
Total flow—100 SCFM
Ozone Requirement ~150 lb/day of ozone at 3% $O_3$
Generator Requirement—3×50#/day units $100K each
Pulsed Ozone Assumptions
10 wells injecting 10 SCFM of 3% ozone @ 2 hr/day/well
Total flow: 10 SCFM of 3% $O_3$ and 100 SCFM total air flow
Ozone Requirement—14 lb/day
Generator Required: Single 25#/day unit @ $50K The typical total cost for these systems might compare as follows:

Comparison of Continuous and Pulsed Ozone System

|  | Continuous Ozonation | Pulsed Ozonation |
|---|---|---|
| Capital (Generator, Wells and Piping) | 250,000 | 100,000 |
| Installation | 120,000 | 150,000 |
| Utilities/yr Ozone | 50,000 | 20,000 |
| Labor/yr | 80,000 | 80,000 |
| Treatment Time, Site | 2 years | 3 years |
| Total Treatment Cost | 630,000 | 540,000 |

In its most basic form, the present invention is a method of treating a solid matrix containing organic contaminants comprising the steps of a) injecting ozone into the solid matrix for a period of time known as the pulse duration; b) interrupting the injection of the ozone into the solid matrix for a period of time known as the gap duration; and c) repeating step a) at least one additional time. In practice, it is expected that steps a) and b) will be sequentially repeated multiple times so as to achieve a greater efficiency in the use of ozone. The preferred gap duration is from about 2 to about 48 hours, while the most preferred gap duration is from about 24 to about 36 hours. The preferred pulse duration is from about 0.25 hours to about 8 hours, while the most preferred pulse duration is either about 0.25 hours or from about 2 hours to about 3 hours.

Pulsing ozone into a solid matrix containing organic contaminants increases the efficiency of ozone usage, as compared to a continuous ozonation system, from several fold to an order of magnitude. Less ozone is used to obtain an equivalent, reduction in the contaminants. The pulse duration and the gap duration are the two key control parameters in ozone pulsing. While the total amount of ozone added is also important, it is largely a function of the amount of contaminant present in the solid matrix. The gap duration has the largest effect on ozone efficiency. The pulse duration also effects ozone efficiency but not as dramatically as does the gap duration.

Ozone can be supplied by any of the commercially available ozone generation systems. While these systems can generally supply ozone at concentrations of up to about 15% ozone, the optimal concentration range is from about 3% to about 7% ozone. The feed to the ozone generator is usually either air or oxygen. When air is used as the generator feed, a 2-3% ozone stream is usually generated. When oxygen is used as the feed gas, 5-7% ozone is typically generated. With either feedstock, the ozone concentration can be increased by increasing the residence time of the feed gas in the generator. This is done by decreasing the feed rate into the ozone generator. It may be presupposed that higher ozone concentrations would increase the speed of the reaction. However, higher concentrations are generally more costly to generate.

The total ozonation time, i.e., the cumulative total of the pulse duration times, has only a moderate effect on the ozone efficiency. Pulsed ozonation is most efficient at the beginning of the ozonation process. The efficiency drops off slightly with increasing time. This is probably due to the more accessible and/or reactive organics being oxidized first and the more strongly absorbed organics requiring more exposure to ozone. Compared to continuous ozonation, the decrease in efficiency for pulsed ozonation is much less.

As would be expected, the total ozonation time has a substantial effect on the percent destruction of the organic contaminants. The total ozonation time exhibited the best destruction at from about 9 to about 12 hours. Percent destruction increased dramatically in going from 4 hours to 8 hours and much slower in going from 8 hours to 12 hours. In general, the more ozone to which an organic contaminant is exposed, the greater its resulting destruction. This was evident in the high percent reductions obtained with continuous ozonation.

By monitoring the ever decreasing concentrations of the target contaminants, one skilled in the art can easily determine when to terminate either a pulsed ozonation process or a continuous ozonation process. The desired clean-up level is usually determined by the site owner in conjunction with the regulatory agency having jurisdiction over the cleanup. Preferably, the pulsed ozonation process of the present invention would be operated until a substantial amount of the organic contaminant has been destroyed.

During the gap duration period, when the injection of ozone into the solid matrix is interrupted, one can optionally choose to inject either air or oxygen into the solid matrix to promote biodegradation therewithin. However, the advantages of doing so may not be very significant and is not a necessary component of the pulsed ozone approach. To maximize the potential for biodegradation, pulse durations of about less than an hour should be used along with gap durations of from about 36 to about 72 hours.

Pulsed ozonation can generally be used in treating any organic contaminants that may be contained within a solid matrix. Pulsed ozonation is most beneficial in the treatment of solid matrices containing recalcitrant organic compounds having one or more of the following properties: non-volatile (volatility limit less than about 1 mm Hg.): insoluble (solubility limit less than about 1000 ppm): non-biodegradable ($BOD_5$ less than about 0.1 mg/L oxygen.) (The solubility can be higher if the compound is both non-volatile and non-biodegradable.) Specific compounds and classes of compounds which can be treated using the present invention include the following:

Substituted Aromatics:
such as chlorobenzene and di-, tri-, and tetra chlorobenzenes.

Hydrocarbons>C8 (number of carbon atoms in molecule):
such as weathered fuels (gas, jet, diesel); No. 2, No. 4, and No. 6 fuel oils; API separator sludge; coal tars; oily wastes; crude oil; residual oils; resid; Bunker C; cutting oils; lubricating oils.

Pesticides:
DDT, DDX, Chlorinated aryloxyalkanoic Acids such as 2,4-D; or s-Triazines such as atazine, simazine; or urea herbicides such as monuron, chloroxuron; or Amide herbicides such as alachlor and propachlor; pyretherin, rotenone, chlordane, heptachlor, diazinon, parathion, malathion, carbofuran, propoxur, aldicarb, permethrin, lindane, epichlorhydrin, toxaphene or those listed in EPA Method 8018.

Phthlates:
such as BEHP, Bis-2ethylhexyl phthlate, dioctylphthlate.

Explosives:
such as RDX, TNT, dinitrotoluene.

Surfactants:
such as Alkylarylsulfonates, lignosulfonates.

Wood Related Wastes:
such as paper making wastes, humates, lignins, kraft pulp wastes, terpenes, turpentine.

The phrase "solid matrix" as used herein is intended to include solid, permeable and semi-permeable materials such as soils, either saturated or unsaturated with water, and sludges.

The present invention can be successfully applied either in situ or ex situ.

A number of treatment configurations may be used in practicing this invention. Some of the basic systems include a vadose zone system as shown in FIG. 7. While only a single injection well and a single extraction well are shown in this drawing-(and in FIG. 8), it is understood that multiple injection wells and multiple extraction wells can readily be used at any given site. One of the advantages of pulsing ozone as compared to a continuous ozonation process is the ability to service multiple injection points using fewer ozonation generators.

Another treatment system is a saturated zone system with sparge points and vent well as shown in FIG. 8. Other treatment systems include a slurry reactor for excavated soils, a constructed pile with alternating levels of perforated pipe, and a container equipped with ozone injection piping.

FIGS. 9 and 10 depict different configurations of an ozone pulsing system. FIG. 9 depicts a parallel system with separate ozone and air/$O_2$ manifolds, whereby an injection well receives either ozone or air/$O_2$. The addition of ozone or air/O2 is controlled by a valve—either a solenoid valve or a manual valve. FIG. 10 depicts a coaxial system wherein the ozone is piped directly into the air/$O_2$ stream. The application of ozone is controlled by a valve—either a solenoid valve or a manual valve Operationally, pulsed ozonation can be used alone or combined with other technologies such as bioremediation, product recovery, thermally enhanced product recovery, soil vapor extraction, and aair sparging.

While the forms of the invention herein disclosed constitute present embodiments of the invention, many others are possible. It is not intended to mention all of the possible equivalent forms or ramifications of the invention. It is to be understood that the terms used herein are merely descriptive rather than limiting, and that various changes may be made to the invention without departing from the spirit or the scope of the invention.

We claim:

1. A method of treating soil containing organic contaminants and microbials which are capable of biodegrading the organic contaminants in the presence of oxygen but are also susceptible to destruction by ozone comprising the steps of a) injecting ozone into the soil for a period of time known as the pulse duration, the pulse duration being sufficiently long to at least partially oxidize the contaminants but insufficient to completely destroy the microbials; b) interrupting the injection of the ozone into the soil and injecting oxygen or air into the soil for a period of time known as the gap duration so as to allow the regeneration of the microbials and the biodegradation of the organic contaminants; and repeating step a) at least one additional time.

2. The method of claim 1 wherein the gap duration is from about 2 hours to about 48 hours.

3. The method of claim 1 wherein the gap duration is from about 24 hours to about 36 hours.

4. The method of claim 1 wherein the organic contaminants are recalcitrant and the gap duration is from about 36 hours to about 48 hours.

5. The method of claim 1 wherein the pulse duration is from about 0.25 hours to about 8 hours.

6. The method of claim 1 wherein the pulse duration is about 0.25 hours.

7. The method of claim 1 wherein the pulse duration is from about 2 hours to about 3 hours.

8. The method of claim 1 wherein the gap duration is from about 24 hours to about 36 hours and the pulse duration is about 0.25 hours.

9. The method of claim 1 wherein the gap duration is from about 24 hours to about 36 hours and the pulse duration is from about 2 hours to about 3 hours.

10. The method of claim 1 wherein the gap duration is from about 36 hours to about 72 hours and the pulse duration is less than about 1 hour.

11. The method of claim 1 wherein the organic contaminants are PAHs, chlorophenols, substituted aromatics, greater than C-8 hydrocarbons, pesticides, phthlates, explosives, surfactants or wood related wastes.

12. The method of claim 1 wherein steps a) and b) are sequentially repeated multiple times until a substantial amount of the organic contaminants has been destroyed.

13. The method of claim 1 wherein the soil is an unsaturated soil.

14. The method of claim 1 wherein the soil is saturated with water.

15. The method of claim 13 wherein the soil is treated in situ.

16. The method of claim 14 wherein the soil is treated in situ.

17. The method of claim 1 wherein the organic contaminants are PAHs.

18. The method of claim 1 wherein the organic contaminants are coal tars.

19. The method of claim 1 wherein the organic contaminants are creosote.

20. An in situ method of treating soil containing recalcitrant organic contaminants and microbials which are capable of biodegrading the organic contaminants in the presence of oxygen but are also susceptible to destruction by ozone comprising the steps of a) injecting ozone into the soil, in situ, for a period of time known as the pulse duration, the pulse duration being sufficiently long to at least partially oxidize the contaminants but insufficient to completely destroy the microbials; b) interrupting the injection of the ozone into the soil and injecting oxygen or air into the soil for a period of time known as the gap duration so as to allow the regeneration of the microbials and the biodegradation of the organic contaminants; and sequentially repeating steps a) and b) until a substantial amount of the organic contaminants has been destroyed.

21. The method of claim 20 wherein the gap duration is from about 24 hours to about 36 hours and the pulse duration is about 0.25 hours.

22. The method of claim 21 wherein the pulse duration is from about 2 hours to about 3 hours.

23. The method of claim 20 wherein the organic contaminants are PAHs, chlorophenols, substituted aromatics, greater than C-8 hydrocarbons, pesticides, phthlates, explosives, surfactants or wood related wastes.

24. A method of treating a soil containing organic contaminants and bacteria, said bacteria being capable of biodegrading the organic contaminants in the presence of oxygen and also being susceptible to destruction by ozone, comprising the steps of a) injecting ozone into the soil for a period of time known as the pulse duration, the amount of ozone injected being sufficient to at least partially oxidize the contaminants but insufficient to completely destroy the bacteria, b) interrupting the injection of ozone into the soil for a period of time known as the gap duration, the gap duration being sufficiently long so as to allow the regeneration of the bacteria and the biodegradation of the organic contaminants, c) injecting air or oxygen into the soil during the gap duration so as to further regenerate the bacteria, and d) repeating steps a), b), and c) multiple times.

25. The method of claim 24 wherein the gap duration is from about 36 hours to about 72 hours and the pulse duration is less than about 1 hour.

26. The method of claim 25 wherein the pulse duration is about 0.25 hours.

27. The method of claim 24 wherein additional bacteria capable of biodegrading the organic contaminants are added to the soil during the gap duration.

28. A method of treating a soil containing organic contaminants and microbials which are capable of biodegrading the organic contaminants in the presence of oxygen but are also susceptible to destruction by ozone comprising the steps of a) injecting ozone into the soil for a period of time known as the pulse duration, the pulse duration being sufficiently long to at least partially oxidize the contaminants but insufficient to completely destroy the microbials; b) interrupting the injection of the ozone into the soil and injecting oxygen or air into the soil for a period of time known as the gap duration so as to allow the regeneration of the microbials and the biodegradation of the organic contaminants; and repeating step a) at least one additional time wherein the organic contaminants are substantially oxidized and the ratio of ozone applied to contaminants oxidized is less than about 2 kg ozone/kg contaminants.

* * * * *

UNITED STATES PATENT AND TRADEMARK OFFICE
CERTIFICATE OF CORRECTION

PATENT NO. : 7,427,177 B2
APPLICATION NO. : 11/217126
DATED : September 23, 2008
INVENTOR(S) : Richard A. Brown et al.

It is certified that error appears in the above-identified patent and that said Letters Patent is hereby corrected as shown below:

Col. 11, line 3, after "using a" delete "20" and insert --20%--.

Col. 13, line 64, after "mm" delete "Hg.):" and insert --Hg);--.

Col. 13, line 65, after ")" delete the ":" and insert --;--.

Col. 14, between lines 3 and 4 insert:
--PAHs (Poly Aromatic Hydrocarbons):
Specifically carcinogenic PAHs - benzo (a) anthracene,
benzo (a) pyrene, benzo (b) fluoranthene, chrysene, dibenzo (a,h)
anthracene, indeno (1, 2, 3 - c, d) pyrene; and coal tars, creosote,
combustion residues.
Chlorophenols:
such as PCP (pentachlorophenol), dinoseb.--.

Col. 14, line 65, after "and" delete "aair" and insert --air--.

Signed and Sealed this

Twelfth Day of May, 2009

JOHN DOLL
*Acting Director of the United States Patent and Trademark Office*